July 23, 1963   O. HERMANN   3,098,906
ZERO SPEED SWITCH

Filed Feb. 2, 1962   2 Sheets-Sheet 1

INVENTOR.
OTTO HERMANN
BY Toulmin & Toulmin
ATTORNEYS

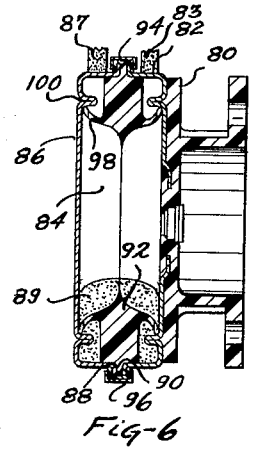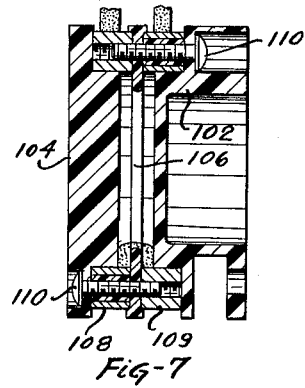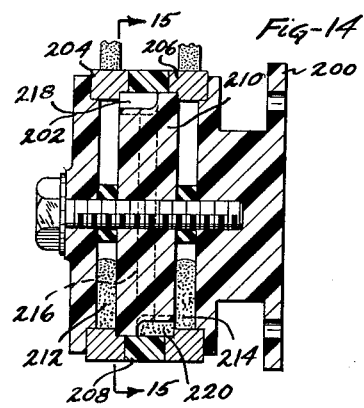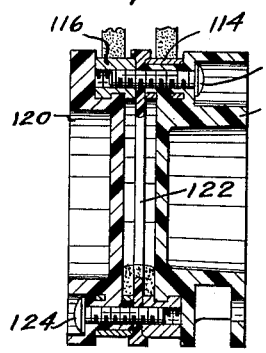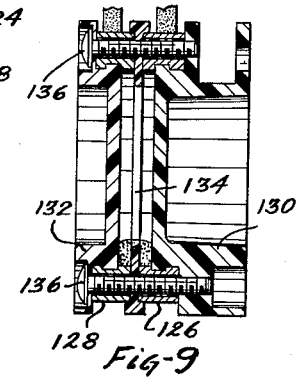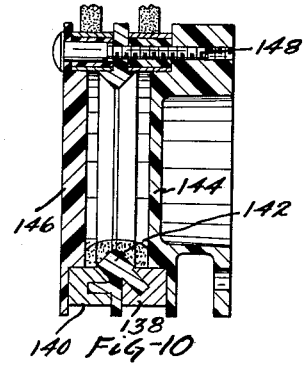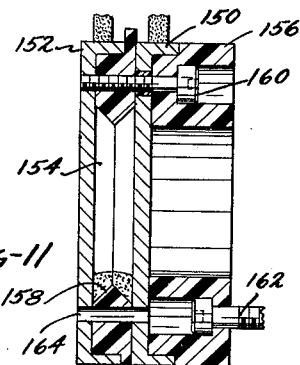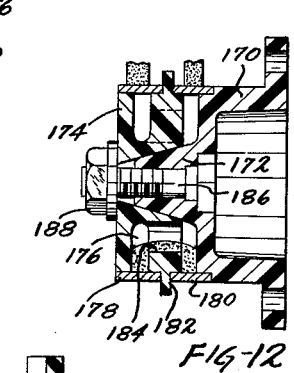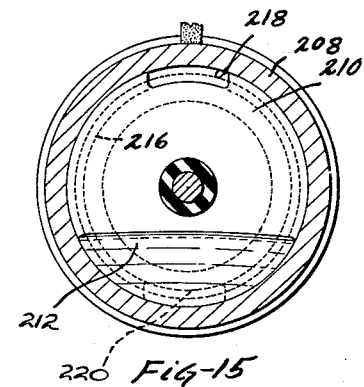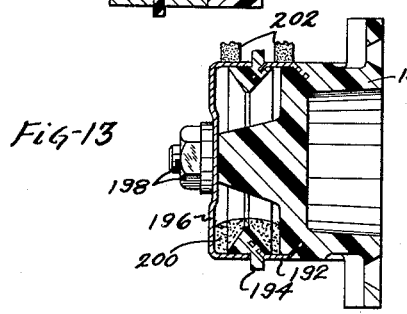

United States Patent Office 3,098,906
Patented July 23, 1963

3,098,906
ZERO SPEED SWITCH
Otto Hermann, Cincinnati, Ohio, assignor to The R. K. Le Blond Machine Tool Co., Cincinnati, Ohio, a corporation of Delaware
Filed Feb. 2, 1962, Ser. No. 170,686
6 Claims. (Cl. 200—80)

This invention relates to electric switches and is particularly concerned with a rotary switch employing mercury as a conductive material.

In connection with many machine tools and the like, it is important to be able to determine the instant of stopping or starting a rotating member, or to be able to fix a predetermined time before or after the instant of starting or stopping. Switches of the rotary type that can be connected to the rotating member are known but heretofore such switches have been expensive and complex and are usually quite inaccurate with respect to fixing the instant of starting or stopping of the rotating member.

Among the faults of such switches according to the prior art is the fact that some thereof operate on the inertia principle, in which case, the rate of acceleration or deceleration of the rotating member may be influential on the reaction time of the switch. In other cases, the switch will operate by means of friction and this can be objectionable on account of the heat developed and the wear that takes place.

In my prior application, Serial No. 63,740, filed October 20, 1960, now Patent No. 3,094,595, I show a switch of the rotary type in which a pool of mercury is employed for making and breaking the electrical connection between two terminals so that the switch can indicate either rotation or non-rotation of the member to which it is attached. This switch structure avoids the drawbacks referred to above but has a drawback of its own which can become a serious matter where the switch is cycled a great many times as would be the case with certain machine operations.

This drawback comes about because the making and breaking of the circuit in my prior switch, as disclosed in the above identified application, is accomplished between the mercury and a metal terminal or electrode within the switch so that the making and breaking of the contact occurs between two dissimilar metals. This causes arcing and burning and thereby deterioration of both the metal terminal and the mercury and possible severe contamination of the mercury.

In the switch according to the present invention, this drawback is eliminated and the making and the breaking of the circuit is accomplished entirely within the pool of mercury, the said mercury dividing into two pools to break the circuit and combining into a single pool to make the circuit. The making and breaking of the circuit thus does not take place by separating or joining two dissimilar metals but takes place by joining or separating only one metal, namely, mercury.

I have found that the switch according to my improved construction exhibits substantially no deterioration, even though cycled rapidly and over a long period of time, and, accordingly, the switch according to the present invention is superior to those of the prior art and is even superior to the switch disclosed and described in my above identified co-pending application.

With the foregoing in mind, it will be evident that the primary object of the present invention is to provide a rotary switch utilizing mercury which is greatly improved in operating characteristics over switches according to the prior art.

Another object of this invention is the provision of a switch arrangement of the nature referred to which is relatively simple to construct.

Still another object is the provision of a rotary mercury switch in which there is substantially no deterioration or contamination of the mercury on account of the making and breaking of the circuit through the switch.

A still further object of this invention is to provide a rotary mercury switch which is equally effective in both directions of rotation.

Still another object of this invention is the provision of a rotary mercury switch which is insensitive to direction of rotation and which can be arranged for either making or breaking the circuit therethrough when the switch is stationary while either breaking or making the circuit therethrough when the switch is rotating.

Still a further object of this invention is the provision of a rotary mercury switch in which any predetermined delay period can be built into the switch so that the making or breaking of the circuit by the switch can be caused to occur a predetermined time after the switch either commences to rotate or comes to a halt.

These and other objects and advantages of this invention will become more apparent upon reference to the following specification, taken in connection with the accompanying drawings, in which:

FIGURES 6 through 13 are vertical sectional views through modified constructions of the switch;

FIGURE 14 is a vertical sectional view through still another modified form which the switch according to the present invention can take and which modification is particularly characterized in that the circuit through the switch is made when the switch is rotating and is broken when the switch is halted; and FIGURE 15 is a vertical sectional view indicated by line 15—15 on FIGURE 14 showing the arrangement in the switch of the channel which the mercury fills when the switch is rotating thereby to make the circuit through the switch.

Figure 1:
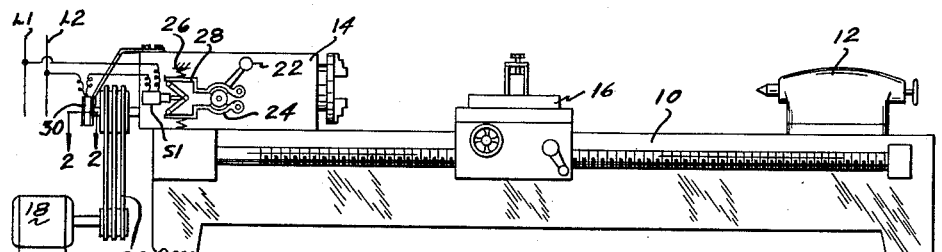
FIGURE 1 is a diagrammatic representation of a lathe showing a switch according to the present invention associated therewith and connected in circuit with a control element of the machine.

Referring to the drawings somewhat more in detail, in FIGURE 1 there is shown a lathe which may comprise a bed 10, a tailstock 12, a headstock 14 and a carriage 16. The headstock includes a spindle adapted for being driven as by motor 18 through drive belts 20. The headstock includes shiftable gearing under the control of a control element 22. Control element 22 has associated therewith a brake 24 that is normally engaged by springs 26 so as to prevent movement of control element 22. Energization of a solenoid S1 is effective through linkage 28 to release the brake so that the control element 22 can be shifted.

Solenoid S1 is connected in circuit between power lines L1 and L2 by a rotary mercury switch 30 constructed according to this invention. Switch 30 is normally closed when it is halted so that when the drive motor 18 is deenergized and comes to a halt, the switch closes and the solenoid S1 is energized to release brake 24 whereupon control element 22 can be shifted. When motor 18 is again energized, however, switch 30 opens and de-energizes solenoid S1 and the brake 24 closes and control element 22 is held against shifting movement.

The construction of switch 30 will be seen in FIGURES 2 through 5. This switch, generally, comprises a generally cylindrical cavity in which there is a pool of mercury. The mercury engages two conductive slip rings and, when the switch is stationary, the mercury bridges between the slip rings and, when the switch is rotating, the pool of mercury separates to form two pools, one engaging each of the said slip rings so that when the switch is rotating, there is no electrical connection between the slip rings.

The switch is made up of a first body part 32 of insulating material having flange means 34 with keyhole shaped slots 36 through which cap screws 38 pass to attach the switch to rotating member 40. Body part 32 has a central axial sleeve portion 42 that telescopically engages a corresponding axial sleeve portion 44 on a second body part 46 also of insulating material. The inner sleeve part 44 may be formed outwardly as at 48 for fixedly interconnecting the said body parts, or other fastening means securing the body parts together may be employed.

The said body parts define therebetween an annular cavity 50 and located in the annular cavity 50 is an annular divider member 52 of electrical insulating material. This divider member 52 extends radially outwardly to about the same distance as the outer peripheries of body parts 32 and 46 and retained between the divider member and the body parts are the annular slip rings 54 and 56 which may have their edges located in slots in the divider member and the body parts thus leaving both the outer and inner cylindrical surfaces of the slip rings exposed.

The outer surfaces of the slip rings are engaged between conductive brushes 58 and 60 which form the means for electrically connecting the switch in an electric circuit. The inner surfaces of the slip rings are exposed to the cavity between the body parts so that a quantity of mercury in the cavity 50 between the body parts will be enabled to make electrical contact with the slip rings.

Figure 2:
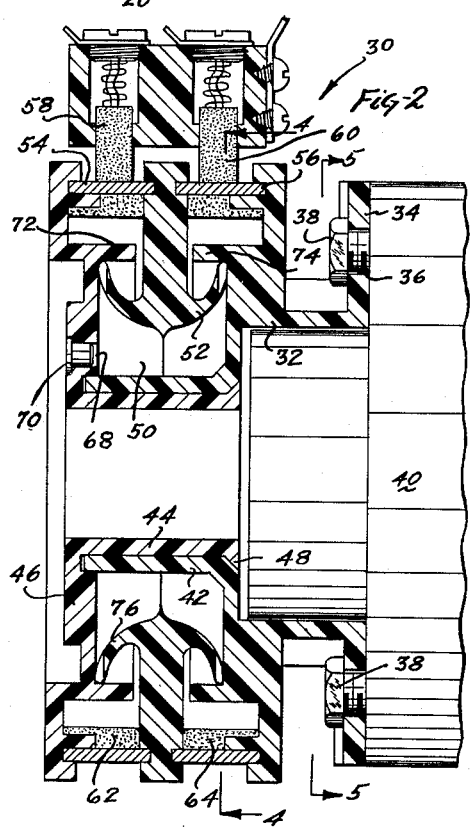
FIGURE 2 is a vertical sectional view through the switch as indicated by line 2—2 on FIGURE 1 and showing the switch as it appears when it is rotating.

When the switch is rotating, and in which condition it is indicated in FIGURE 2, the mercury in the cavity forms two annular pools 62 and 64, one on each side of divider member 52. Each annular pool of mercury contacts one of the slip rings but since the two pools of mercury are electrically isolated from each other, there is no contact established between the slip rings and the circuit through the switch is, therefore, broken.

Figure 3:
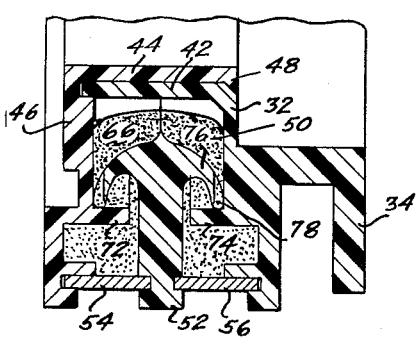
FIGURE 3 is a fragmentary view of the lower portion of the switch showing the appearance of the switch when it is stationary and the pool of mercury as collected in the bottom of the switch.

Upon the switch coming to a halt, however, the mercury drops to the bottom of the switch and, at that time, will flow around the divider member and collect in a single pool 66 in the bottom of the switch as indicated in FIGURE 3. This single pool of mercury forms an electrical connection between the slip rings so that with the switch halted, there is an electrical connection extending from one slip ring to the other and the circuit through the switch is closed.

It will be noted that the making and breaking of the circuit through the switch takes place entirely within the body of mercury therein and that there is no interruption of establishing of the circuit by engagement of separation of the mercury from either of the slip rings or any other electrode or terminal of a metal other than mercury.

There is thus no burning or pitting of the slip rings and no contamination of the mercury.

The possibility of oxidation occurring in the switch according to my invention is also substantially completely eliminated by providing body part 46 with a filling hole 68 closed by a plug 70. This filling hole can be availed of for introducing the mercury into the switch after it has been assembled and can also be availed of for flushing out the switch with an inert gas such as nitrogen or carbon monoxide and for entrapping the inert gas therein. This plug can, of course, be availed of for removing the mercury from the switch and refilling it in the event this should become necessary.

A particularly important feature of the switch of the present invention is the provision therein of means for delaying the closing of the switch when it is halted. This is accomplished by restricting the movement of the mercury from its two pool condition to its single pool condition. This is accomplished in the switch illustrated by providing the body parts with axially extending cylindrical flanges 72 and 74 which extend inwardly to a position relatively close to divider member 52 so that the mercury flowing into a single pool at the bottom of the switch must pass through the relatively narrow annular passages on the opposite sides of the divider member 52. Still further, the divider member itself about its radially inner part is provided with outwardly extending wing or marginal portions 76 which engage the two body parts.

Figure 4:
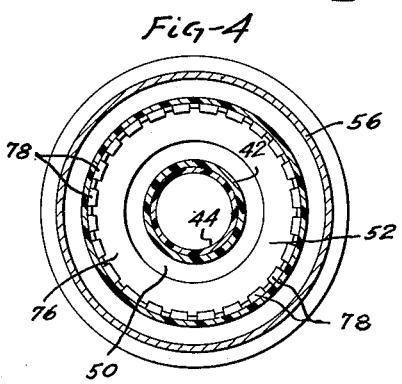
FIGURE 4 is a vertical sectional view indicated by line 4—4 on FIGURE 2 showing the construction whereby a predetermined time delay can be built into the switch.
Figure 5:
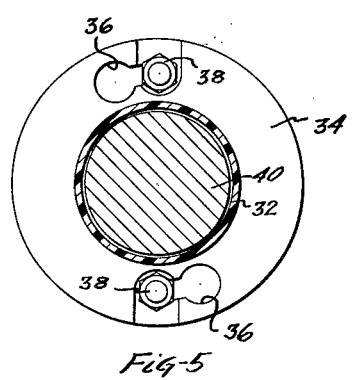
FIGURE 5 is a sectional view indicated by line 5—5 on FIGURE 2 showing one manner in which the switch can be mounted on a rotating member.

The tips of these wing portions where they engage the body parts are provided with notches 78 which will best be seen in FIGURES 2, 3 and 4. These notches can be made of any desired size and there can be any desired number thereof and these form the principal constricting means for controlling the rate at which the mercury will flow from its two pool condition to its single pool condition and the notches thus serve to control the time delay established between the instant the switch comes to a halt and the instant at which the circuit through the switch is established.

The particular arrangement disclosed thus makes it possible to adapt the switch to widely varying conditions and substantially any desired time delay can be built into the switch and this time delay, if necessary, can be changed by modifying the size of the slots 78.

FIGURES 6 through 13 show modified arrangements of a switch of the nature described above except that no time delay is provided except in connection with the FIGURE 6 modification. All of these switches, however, have in common that they are insensitive to direction of rotation and make and break the circuit directly in the pool of mercury.

In FIGURE 6, for example, there is a body part 80 of electrical insulating material which has secured thereto, as, for example, by being incorporated in the body as an insert at the time of molding, a metal cup-like element 82. Spaced from cup-like element 82 and defining therewith a cavity 84 is a second cup-like element 86, also of metal. These cup-like elements have flange means 88 engaging opposite sides of a peripheral flange 90 of a divider member 92 which is quite similar to divider member 52 of the first described modification. Flanges 88 are insulatingly interconnected by an insulating strip 94 and a metal retainer 96.

The divider member 92 has notched wing portions 98 that cooperate with internal flange means 100 of the cup-like members to provide for a delay in the closing of the circuit when the switch comes to a halt. In all other respects, the switch of FIGURE 6 operates in the same manner as the switch previously described.

The switch of FIGURE 6 employs the cup-like members 82 and 86 as the slip rings and the electrically conductive brushes 83 and 87 will bear directly on the outer surfaces of the cup-like members so that the pool of mercury 89 can make and break the circuit therebetween.

The switch of FIGURE 7 has body parts 102 and 104 of insulating material and an intermediate divider member 106 also of insulating material and clamped between the body parts and on opposite sides of divider member 106 are slip rings 108 and 109. Screws 110 hold the unit in assembled condition and each screw extends through one body part and passes insulatingly through the adjacent slip ring and then through the divider member and is threaded into the other slip ring. In the switch of FIGURE 7 the pool of mercury 112 will change from a single pool condition when the switch is halted to a double pool condition when the switch is rotating on account of divider member 106.

The switch of FIGURE 8 is similar to the switch of FIGURE 7 except the metal slip ring 114 and 116 in FIGURE 8 are illustrated as having been molded directly into the insulating body parts 118 and 120. The divider member 122 is clamped between the body parts by the screws 124 each of which is threaded into one of the slip rings and insulated from each other.

In FIGURE 9, there is shown an arrangement where the slip rings 126 and 128 are molded directly into the insulating body parts 130 and 132 and the body parts are held together with the divider member 134 therebetween by screws 136 that are insulated from both of the slip rings and which thread into the insulating body part 130.

In FIGURE 10, I show how the slip rings 138 and 140 could be joined to the insulating divider member 142 at the time of molding the divider member and in this modification the insulating body parts 144 and 146 are clamped to opposite sides of the divider member-slip ring assembly by screws 148 which pass insulatingly through the slip rings and are threaded into body part 144.

In FIGURE 11, the slip rings 150 and 152 are in the form of flanged discs and thus themselves define the cavity 154 in which the pool of mercury is placed. An insulating support member 156 is provided and located between the slip rings is the insulating dividing member 158. Cap screws 160 pass through support member 156 and insulatingly through slip ring 150 and then through divider member 158 and thread into slip ring 152. In this modification, screws 162 may be provided for attaching the support member 156 to a rotating member and access to the heads of screws 162 may be had by way of hole 164.

In FIGURE 12, insulating support member 170 has a conical projection 172 thereon and seated on conical projection 172 is a member 174 which, together with the support member, defines the mercury receiving cavity 176. This cavity is confined about its outer periphery by slip rings 178 and 180 which at their edges engage the body member 174 and the support member 170 and are spaced apart by the divider portion 182 that is integral with body part 174.

The divider portion 182 is provided with apertures 184 through which the mercury pool extends when the switch is halted and the mercury is forming a single continuous pool between the slip rings. A screw 186 and nut 188 provide the means for securing member 174 to member 170.

FIGURE 13 shows an arrangement similar to that of FIGURE 12 except that in FIGURE 13 the insulating support member 190 and a metal slip ring member 192 and the insulating divider member 194 are all joined together as an integral unit as by molding the support member and divider member with the slip ring 192 as an insert.

The other slip ring 196 is a cup-like element secured to support member 190 by the nut and screw means 198 and confining therewith the mercury receiving cavity 200.

As in connection with the modification of FIGURE 6, the brushes 202 ride directly on the metal members 196 and 192.

The switch arrangements described above have all been of the type in which the circuit through the switch is established when the switch is stationary and in which the circuit through the switch is broken when the switch is rotating.

FIGURES 14 and 15 show a switch arrangement which operates in such a manner that the circuit through the switch is broken when the switch is stationary and is established when the switch is rotating. The switch of the modification of FIGURES 14 and 15 is, similar to the previously described switches, insensitive to direction of rotation of the switch and accomplishes the making and breaking of the circuit entirely within the body of mercury therein.

In FIGURES 14 and 15, there is an insulating support member 200 which also forms one of the body parts and spaced therefrom is a second body part 202. Arranged between the body parts are the slip rings 204 and 206 and therebetween is a spacer ring 208 and a divider member 210. The spacer member 210, as opposed to the spacer members heretofore described, extends completely across the cavity between the body parts and normally divides the body of mercury in the cavity into two pools 212 and 214 in contact with each of the slip rings 204 and 206.

When the switch is stationary, the mercury lays in two pools and the connection between the slip rings is interrupted. When the switch rotates, however, the connection between the slip rings is established and this accomplished by providing divider member 210 with a peripheral groove 216 which is connected by notch 218 on one side with the portion of the cavity in which the pool of mercury 212 is contained while diametrally opposite notch 218 is a notch 220 communicating the groove with the portion of the cavity in which the pool of mercury 214 is located.

Whenever the switch is stationary, it will be evident that there can be no connection between the two pools of mercury. When the switch rotates, however, and the mercury throws out into an annular layer about the inside of the cavity, the mercury will pass through notches 218 and 220 and into groove 216 and will thus establish a connection through the body of mercury between the slip rings 204 and 206.

The modification of FIGURES 14 and 15 is thus one in which the breaking of the circuit is accomplished when the switch halts. This is done entirely within the body of mercury so that there no making or breaking of contacts between dissimilar metals.

All of the modifications described are similar in that they can be provided with filling holes similar to the holes 68 of the first described modification through which the mercury can be introduced or removed or through which hole the switch cavity can be flushed out with an inert gas or supplied with an inert gas so as to prevent oxidation of the mercury.

All of the switches are relatively simple in construction and are inexpensive to manufacture and are easy to connect into an electrical circuit.

The switches of FIGURES 2 and 6 have time delays built therein and certain of the other switch structures are of such a nature that time delay means could be incorporated therein if so desired. The modification of FIGURES 14 and 15, for example, could be provided with a time delay feature by restricting the movement of the mercury in the groove 216, and a time delay would result.

All of the switches have in common the provision of two slip rings electrically insulated from each other and each continuously in contact with the mercury within the switch. Each switch also has in common the provision of a divider member of electrically insulating material that provides for separation of the mercury into two separate electrically isolated pools under one condition of operation of the switch, namely, in a condition of rotation, or in a stationary condition.

It will be understood that this invention is susceptible to modification in order to adapt it to different usages and conditions and, accordingly, it is desired to comprehend such modifications within this invention as may fall within the scope of the appended claims.

I claim:

1. In a rotary switch;

a body part adapted for rotation on a predetermined axis, a generally cylindrical cavity in said body part concentric with said axis, spaced slip rings on said body part, mercury in said cavity, said slip rings being in continuous electrical engagement with said mercury, said switch having a condition of rotation on said axis and a condition of non-rotation, means for causing said mercury to change from a single body in one of said conditions to two separate bodies in the other of said conditions, said two bodies each being in electrical engagement with a respective one of said slip rings whereby the opening of the circuit through the switch is accomplished entirely within the body of mercury, and means in said cavity restricting the movement of the mercury from its condition of two separate bodies into its condition of a single body.

2. In a rotary switch, body means adapted for rotation on a predetermined axis and confining a cavity concentric with said axis, said body means comprising axially spaced metal slip ring means having inner surfaces exposed to said cavity at the periphery thereof and outer surfaces exposed to the exterior of said body means, an annular barrier of insulating material projecting inwardly into said cavity between said slip rings, and a body of mercury in said cavity operable when the switch is not rotating to form a single pool in the cavity extending from one slip ring to the other over said barrier and operable when the switch is rotating to form two separate rings of mercury in said cavity on respectively opposite sides of the barrier, each ring engaging one only of said slip rings, and said barrier having an inner annular head portion extending toward at least one side wall of the cavity to form a restricted region through which the mercury must pass in changing from two separate rings to a single pool whereby the closing of the switch by the formation of said single pool is delayed.

3. In a rotary switch;

body means adapted for rotation on a predetermined axis and confining a cavity concentric with said axis, said body means comprising axially spaced metal slip ring means having inner surfaces exposed to said cavity at the periphery thereof and outer surfaces exposed to the exterior of said body means, an annular barrier of insulating material projecting inwardly into said cavity between said slip rings, and a body of mercury in said cavity operable when the switch is not rotating to form a single pool in the cavity extending from one slip ring to the other over said barrier and operable when the switch is rotating to form two separate rings of mercury in said cavity on respectively opposite sides of the barrier, each ring engaging one only of said slip rings, said barrier having an inner annular head portion extending laterally therefrom to at least one of the end walls of the cavity, and restricted passage means formed between said head and wall to control the time required for the mercury to move from said two rings back to a single pool when the switch stops rotating.

4. A rotary switch according to claim 3 in which the head portion of said barrier has a marginal portion engaging each of said end walls, said marginal portions being notched to define the said restricted passage means.

5. In a rotary switch;

a body part, means forming a cavity in the body part which is generally cylindrical about the axis of rotation of the switch, insulating barrier means projecting into the outer periphery of the cavity between the longitudinal limits thereof, a body of mercury in said cavity disposed part on one side of said barrier means and part on the other side thereof, said body of mercury forming pool means in the bottom of said cavity when the switch is in a condition of non-rotation and forming annular ring means in the cavity when the switch is in a condition of rotation, and passage means extending through said barrier means from one side to the other adapted in one only of said conditions of said switch to receive a portion of the mercury in said parts of the body of mercury, said portion extending from one of said parts to the other of said parts thereby electrically to interconnect said parts, said passage means comprising an annular passage in said barrier means between the ends thereof and in the same radial region as the periphery of said cavity and openings leading from said passage in opposite directions to opposite sides of said barrier means, said openings being circumferentially spaced a greater distance than the circumferential extent of the mercury in said cavity when the switch is not rotating.

6. In a rotary switch;

a body part, means forming a cavity in the body part which is generally cylindrical about the axis of rotation of the switch, insulating barrier means projecting into the outer periphery of the cavity between the longitudinal limits thereof, a body of mercury in said cavity disposed part on one side of said barrier means and part on the other side thereof, said body of mercury forming pool means in the bottom of said cavity when the switch is in a condition of non-rotation and forming annular ring means in the cavity when the switch is in a condition of rotation, and passage means extending through said barrier means from one side to the other adapted in one only of said conditions of said switch to receive a portion of the mercury in said parts of the body of mercury, said portion extending from one of said parts to the other of said parts thereby electrically to interconnect said parts, said passage means comprising an annular passage in said barrier means between the ends thereof and in the same radial region as the periphery of said cavity and openings at opposite ends of a diameter of the barrier means leading from said passage to respectively opposite sides of said barrier means.

References Cited in the file of this patent

UNITED STATES PATENTS

| | | |
|---|---|---|
| 773,123 | Christmas | Oct. 23, 1904 |
| 2,054,957 | Svenson | Sept. 22, 1936 |